(12) United States Patent
Agrawal et al.

(10) Patent No.: US 12,489,842 B2
(45) Date of Patent: Dec. 2, 2025

(54) MODIFYING PRIVILEGE MODES ON AN ELECTRONIC DEVICE BASED ON CIRCUMSTANTIAL TRIGGERS

(71) Applicant: MOTOROLA MOBILITY LLC, Wilmington, DE (US)

(72) Inventors: Amit Kumar Agrawal, Bangalore (IN); Rohit Sisodia, Naperville, IL (US); Mayank Gupta, Naperville, IL (US)

( * ) Notice: Subject to any disclaimer, the term of this patent is extended or adjusted under 35 U.S.C. 154(b) by 230 days.

(21) Appl. No.: 18/336,315

(22) Filed: Jun. 16, 2023

(65) Prior Publication Data

US 2024/0422257 A1 Dec. 19, 2024

(51) Int. Cl.
*H04M 1/72463* (2021.01)
*H04M 1/72451* (2021.01)
*H04M 1/72457* (2021.01)

(52) U.S. Cl.
CPC ... *H04M 1/72463* (2021.01); *H04M 1/72451* (2021.01); *H04M 1/72457* (2021.01)

(58) Field of Classification Search
CPC ......... H04M 1/72463; H04M 1/72451; H04M 1/72457
See application file for complete search history.

(56) References Cited

U.S. PATENT DOCUMENTS 10,812,932 B1 * 10/2020 Stimpson .............. H04W 4/022
2013/0040604 A1 * 2/2013 Sprigg .................. H04L 51/212
455/410

\* cited by examiner

*Primary Examiner* — Farid Seyedvosoghi

(57) ABSTRACT

A method provides techniques for modifying privilege modes on an electronic device based on circumstantial triggers. The method includes identifying, by at least one processor of an electronic device, a context corresponding to a circumstantial trigger. The method includes transitioning the electronic device from operating according to a first privilege mode to operating according to a second privilege mode in response to detecting a start of the circumstantial trigger. The method includes transitioning the electronic device from operating according to the second privilege mode to operating according to the first privilege mode in response to detecting an end of the circumstantial trigger.

20 Claims, 8 Drawing Sheets

MODIFYING PRIVILEGE MODES ON AN ELECTRONIC DEVICE BASED ON CIRCUMSTANTIAL TRIGGERS

BACKGROUND

1. Technical Field

The present disclosure generally relates to portable electronic devices, and more specifically to portable electronic devices that support multiple privilege modes.

2. Description of the Related Art

Modern smartphones and tablet computers are equipped with high-resolution displays, as well as integrated digital cameras that capture high quality still pictures and videos. Smartphones, tablets, and other electronic devices can have benefits for children if used in a responsible and age-appropriate manner. A managing user, such as a parent, may sometimes wish to limit usage of a device and/or applications on the device for a managed user, such as a child. The applications and/or activities that can be restricted can include viewing video, listening to audio, playing games, using social media applications, and so on.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
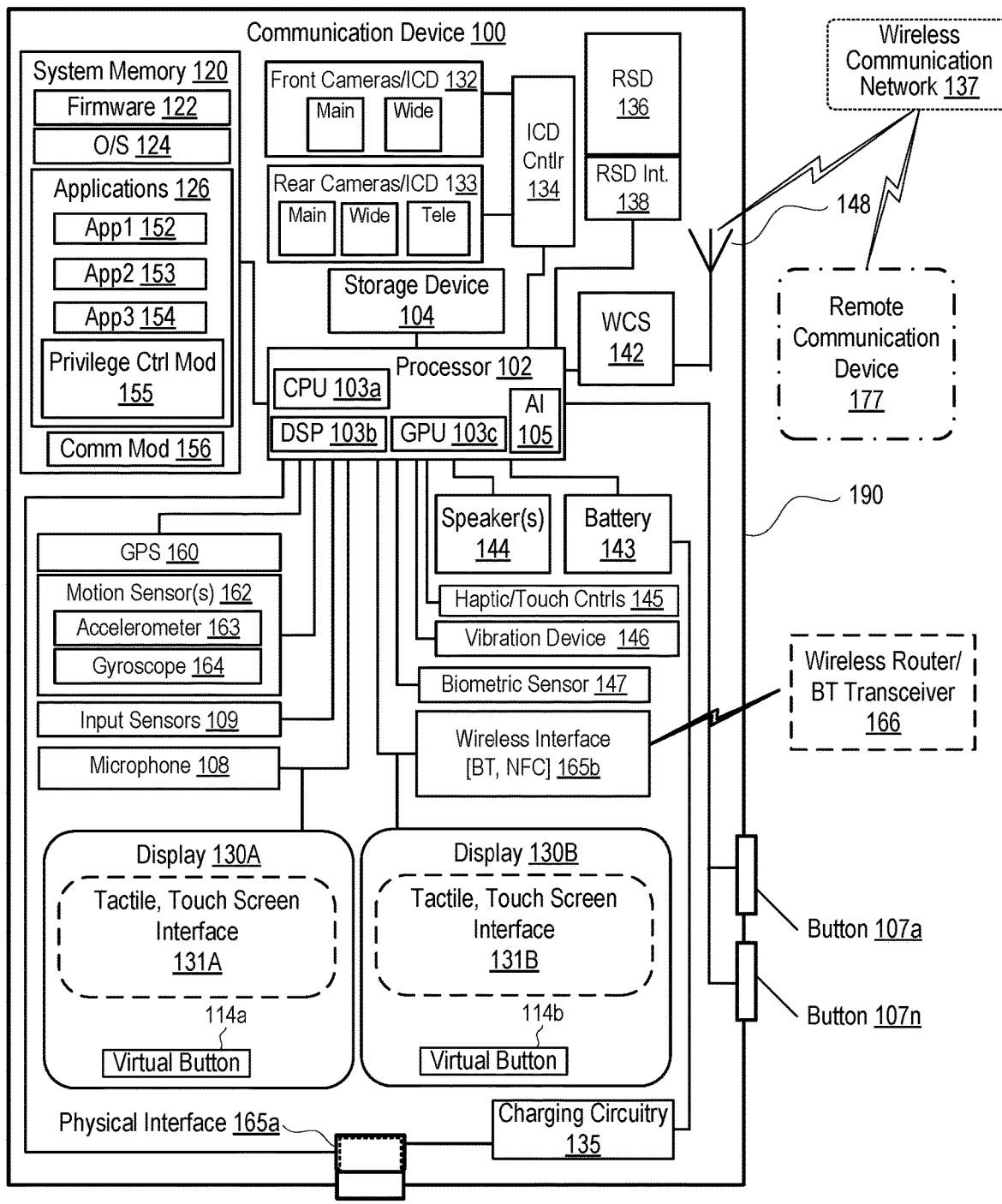
FIG. 1 depicts an example component makeup of an electronic device with a controller that can configure the device to modify device privilege modes based on circumstantial triggers, according to one or more embodiments.

According to different aspects of the disclosure, an electronic device, various methods, and computer program products enable modifying a privilege mode on an electronic device, based on a circumstantial trigger. Specifically, the disclosure enables a managing user to establish a first privilege mode and a second privilege mode for a managed device. The managing user can configure the managed device to be in a second privilege mode temporarily. Based on a circumstantial trigger, the managed device automatically reverts to the first privilege mode. The circumstantial trigger can be based on a distance between a managed device and a managing device, a calendar event, a location of the managed device, a location of the managing device, and/or other criteria.

Caregivers such as parents often place usage limits and restrictions on electronic devices that children use. The electronic devices can include smartphones, tablet computers, wearable computers, and so on. Restrictions can include limits on overall usage, as well as restrictions on individual applications (apps) on a device. As an example, a caregiver, referred to as a managing user, can establish a total weekly usage limit (e.g., 15 hours per week) for an electronic device associated with a child, referred to as a managed user. Additionally, the managing user can establish restriction windows for the electronic device and/or one or more applications installed on the electronic device. As an example, the managing user can configure a privilege mode that prohibits voice calls between the hours of 9:00 pm and 7:00 am the following day. The electronic device that is used by the managed user and on which the restrictions are placed is referred to herein as the managed device.

The first privilege mode may include restrictions that are appropriate for the managed user in most cases. However, there are situations where the managing user may wish to temporarily change the privilege mode of the managed device. As an example, a managed device associated with a teenager may have, by default, restrictions that prevent device usage between the hours of 9:00 pm and 7:00 am the following day. In a situation where the managing user (e.g., parent) is travelling out of the area, and leaving the teenage user at home overnight, the managing user may choose to temporarily allow device usage without restrictions. This allows the teenager to use his/her device to contact a parent, call for help in the event of an emergency, monitor a home security system, and/or other tasks. The parent's intention is to revert the electronic device associated with the child back to the default privilege mode when the parent returns home, but a parent may forget to change the privilege mode back, leaving the managed device associated with the child with incorrect usage privileges.

The disclosed embodiments address the aforementioned problems associated with temporary changes in privilege mode of a managed device. Disclosed embodiments involve establishing a circumstantial trigger, or a combination of circumstantial triggers, in order to automatically revert the managed electronic device to a default privilege mode. Example use cases can include setting the managed electronic device to a less restrictive privilege mode temporarily. Such scenarios can include when a child is on vacation, travelling, or when temporarily separated from their parents/caregivers. During these times, the child's electronic device can be set to a second privilege mode. Once the parent and/or child returns home, the child's electronic device can automatically revert to the first privilege mode. The trigger condition can be based on the relative distance between the parent's and child's devices or a location of the child device, etc. The electronic device is configured to monitor/detect the location of and/or distance between the parent's electronic device and the child's electronic device. Other use cases can include setting the managed electronic device to a more restrictive privilege mode temporarily. Such scenarios can include setting reduced usage limits for the child during the school day or during exams/testing week, in order to encourage the child focus while in school and to spend more time studying and less time using the electronic device. Once the exam period is over or during school holidays, as determined by the electronic device accessing electronic calendar information, the electronic device associated with the child automatically reverts to the first privilege mode.

In one or more embodiments, a controller of an electronic device identifies a context corresponding to a circumstantial trigger. The context can include a temporal event, such as a calendar event. The calendar event can include information denoting a birthday, a week of vacation, and the like. The context can include a geospatial condition, such as a location of an electronic device associated with a child (managed user) and/or parent (managing user). The context can define the start and/or end of a circumstantial trigger. As an example, when a parent leaves his/her child at home to go on a business trip, the circumstantial trigger can start once the distance between the parent's electronic device and the child's electronic device exceeds a predetermined threshold (e.g., 50 miles). Similarly, the circumstantial trigger can end once the distance between the parent's electronic device and the child's electronic device is at or below the predetermined threshold (e.g., 50 miles). As another example, the actual start and end times for the transition of the device can be preset by the parent based on entries in a shared calendar or a calendar of the managed device for a start and end of a business trip or camp or vacation. By using circumstantial triggers as criteria for automatically reverting to a default privilege mode in accordance with disclosed embodiments, healthier usage of electronic devices for managed users can be achieved.

According to a first described aspect of the disclosure, there is provided an electronic device that includes a display, a memory having stored thereon at least one application and a privilege mode control module for controlling the electronic device, and a network interface which enables the electronic device to connect to, and receive instructions from, a second electronic device. At least one processor is communicatively coupled to the display, the memory, and the network interface. The at least one processor executes program code of the privilege mode control module, which enables the electronic device to: identify a context corresponding to a circumstantial trigger; transition the electronic device from operating according to a first privilege mode to operating according to a second privilege mode in response to detecting a start of the circumstantial trigger; and transition the electronic device from operating according to the second privilege mode to operating according to the first privilege mode in response to detecting an end of the circumstantial trigger.

According to a second described aspect of the disclosure, there is provided a method that identifies, by at least one processor of an electronic device, a context corresponding to a circumstantial trigger. The method includes transitioning the electronic device from operating according to a first privilege mode to operating according to a second privilege mode in response to detecting a start of the circumstantial trigger and transitioning the electronic device from operating according to the second privilege mode to operating according to the first privilege mode in response to detecting an end of the circumstantial trigger.

According to a third described aspect of the disclosure, there is provided a computer program product comprising a non-transitory computer readable medium having program instructions, that when executed by a processor of an electronic device, configures the electronic device to perform the functions of the above method processes.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the electronic/communication/computing devices and/or performed by the electronic/communication/computing device are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the numbered terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of an electronic device that is interchangeably referred to as communication device 100, with specific components used to enable the device to operate in a mode to modify privilege modes on the communication device based on one or more circumstantial triggers, and within which various aspects of the disclosure can be implemented, according to one or more embodiments. Examples of communication device 100 include, but are not limited to, mobile devices, a notebook computer, a mobile phone, a smart phone, a digital camera with enhanced processing capabilities, a smart watch, a tablet computer, and other types of electronic devices.

Communication device 100 includes processor 102 (typically as a part of a processor integrated circuit (IC) chip), which includes processor resources such as central processing unit (CPU) 103a, communication signal processing resources such as digital signal processor (DSP) 103b, and graphics processing unit (GPU) 103c. Processor 102 can, in some embodiments, include high quality camera image signal processors (ISPs) (not shown) and dedicated artificial intelligence (AI) engines 105. Collectively, processor 102 supports computing, classifying, processing, transmitting and receiving of data and information, and presenting of graphical images within a display. Processor 102 is communicatively coupled to storage device 104, system memory 120, input devices (introduced below), output devices, including integrated displays 130A and 130B, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors that can capture images that are within the field of view (FOV) of the respective ICD 132, 133. Communication device 100 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In one or more embodiments, one or more of the ICDs may be used for performing user identification via facial recognition.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, general purpose applications 152, 153, and 154, privilege control module 155, and communication module 156. Each module and/or application provides program instructions/code that are processed by processor 102 to cause processor 102 and/or other components of communication device 100 to perform specific operations, as described herein. Descriptive names assigned to these modules add no functionality and are provided solely to identify the underlying features performed by processing of the different modules. For example, privilege control module 155 can include program code to cause processor 102 to identify the start and/or end of one or more circumstantial triggers and to change the privilege mode based on the identifying of the start and/or end of the one or more circumstantial triggers.

Communication module 156 within system memory 120 enables communication device 100 to communicate with wireless communication network 137 and with other devices, such as remote communication device 177 and/or other Internet-connected devices, via one or more of audio, text, and video communications. Communication module 156 can support various communication sessions by communication device 100, such as audio communication sessions, video communication sessions, text communication sessions, receiving notifications, exchange of data, and/or a combined audio/text/video/data communication session.

In one or more embodiments, communication device 100 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 153, 154, 156) stored thereon. Processor 102 can access RSD 136 to provision communication device 100 with program code that, when executed/processed by processor 102, the program code causes or configures processor 102 and/or generally communication device 100, to provide the various functions of detecting and removing a partial occlusion as described herein. The RSD 136 can be an example of a non-transitory or tangible computer readable storage device.

Communication device 100 includes integrated front and rear displays 130A-130B which can both incorporate tactile, touch screen interface 131A-131B that can receive user tactile/touch input. Tactile, touch screen interfaces 131A-131B can thus be utilized as input devices. As a touch screen device, integrated displays 130A-130B allow a user to provide input to or to control communication device 100 by touching features within the user interface presented on integrated displays 130A-130B. The touch screen interfaces 131A-131B can each include one or more virtual buttons, indicated generally as 114a and 114b. In one or more embodiments, when a user applies a finger on one of touch screen interfaces 131A-131B in the region demarked by the virtual button 114a and/or 114b, the touch of the region causes the processor 102 to execute code to implement a function associated with the virtual button. Some embodiments can include a display screen on the same surface of the electronic device as the first image capturing device and the second image capturing device. In one or more embodiments, the controller is configured to render image content from at least one of the first image capturing device or the second image capturing device. Accordingly, the display screen that is on the same surface as the first and second image capturing devices is convenient to use when taking self-photos. In some implementations, integrated display 130A is a primary display that is integrated into a front surface of communication device 100, while the higher quality ICDs are located on a rear surface with rear display 130B. The specific physical and functional characteristics of integrated displays 130A-130B, e.g., screen size, aspect ratio, supported resolution, image quality, video display rate, etc., can vary and are known to or accessible by the processor 102.

Communication device 100 also includes a physical interface 165a. Physical interface 165a of communication device 100 can serve as a data port and can be coupled to charging circuitry 135 and device battery 143 to enable recharging of device battery 143 used to power communication device 100.

Communication device 100 can further include microphone 108, one or more output devices, such as speakers 144, and one or more input buttons 107a-107n. Microphone 108 can also be referred to as an audio input device. In some embodiments, microphone 108 may be used for identifying a user via voiceprint, voice recognition, and/or other suitable techniques. Input buttons 107a-107n may provide controls for volume, power, and ICDs 132, 133. Additionally, communication device 100 can include input sensors 109 (e.g., sensors enabling gesture detection by a user).

Communication device 100 further includes haptic touch controls 145, vibration device 146, fingerprint/biometric sensor 147, global positioning system (GPS) device 160, and motion sensor(s) 162. Vibration device 146 can cause communication device 100 to vibrate or shake when activated. Vibration device 146 can be activated during an incoming call or message in order to provide an alert or notification to a user of communication device 100. According to one aspect of the disclosure, integrated displays 130A and 130B, speakers 144, and vibration device 146 can generally and collectively be referred to as output devices.

Biometric sensor 147 can be used to read/receive biometric data, such as fingerprints, to identify or authenticate a user, and in some embodiments, the biometric sensor 147 can supplement an ICD (camera) for user detection/identification.

Motion sensor(s) 162 can include one or more accelerometers 163 and gyroscope 164. Motion sensor(s) 162 can detect movement of communication device 100 and provide motion data to processor 102 indicating the spatial orientation and movement of communication device 100. Accelerometers 163 measure linear acceleration of movement of communication device 100 in multiple axes (X, Y and Z). Gyroscope 164 measures rotation or angular rotational velocity of communication device 100. Communication device 100 further includes a housing 190 that is external to and contains/protects the components internal to communication device 100.

Communication device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. WCS 142 and antennas 148 allow communication device 100 to communicate wirelessly with a wireless communication network 137 via transmissions of communication signals to and from network communication devices, such as base stations or cellular nodes, of wireless communication network 137. Wireless communication network 137 further allows communication device 100 to wirelessly communicate with remote communication device 177, which can be similarly connected to wireless communication network 137. In one or more embodiments, wireless communication network 137 can be interconnected with a wide area network that can include one or more devices that support exchange of audio and video messages, data, and/or other communication between communication device 100 and remote communication device 177. In one or more embodiments, remote communication device 177 can be a managing device for communication device 100.

Wireless interface 165b can be a short-range wireless communication component providing Bluetooth, near field communication (NFC), and/or wireless fidelity (Wi-Fi) connections. In one embodiment, communication device 100 can receive Internet or Wi-Fi based calls via wireless interface 165b. In one embodiment, communication device 100 can communicate wirelessly with external wireless transceiver device 166, such as a WiFi router or BT transceiver, via wireless interface 165b. In an embodiment, WCS 142, antenna(s) 148, and wireless interface 165b collectively provide communication interface(s) of communication device 100.

GPS device 160 can provide time data and location data about the physical location of communication device 100 using geospatial input received from GPS satellites. In one or more embodiments, the physical location of the communication device 100 is compared with the physical location of remote communication device 177. In one or more embodiments, remote communication device 177 includes components similar to those shown in communication device 100, including, but not limited to, the GPS device 160. The remote communication device 177 may transmit the physical location of remote communication device 177 to communication device 100 via wireless communication network 137. Communication device 100 can then compute a distance between communication device 100 and remote communication device 177 based on the location of both devices. In one or more embodiments, the location information may be transmitted as a tuple of information that includes a longitude-latitude pair. In an alternate embodiment, the location of the devices and distance between devices can be determined using triangulation of wireless signals using known locations of base stations providing wireless coverage to the respective device(s). The locations of the devices can, in one embodiment, be determined based on a known location of a stationary WiFi access point (e.g., a hotel WiFi) to which the device is communicatively connected.

Figure 2:
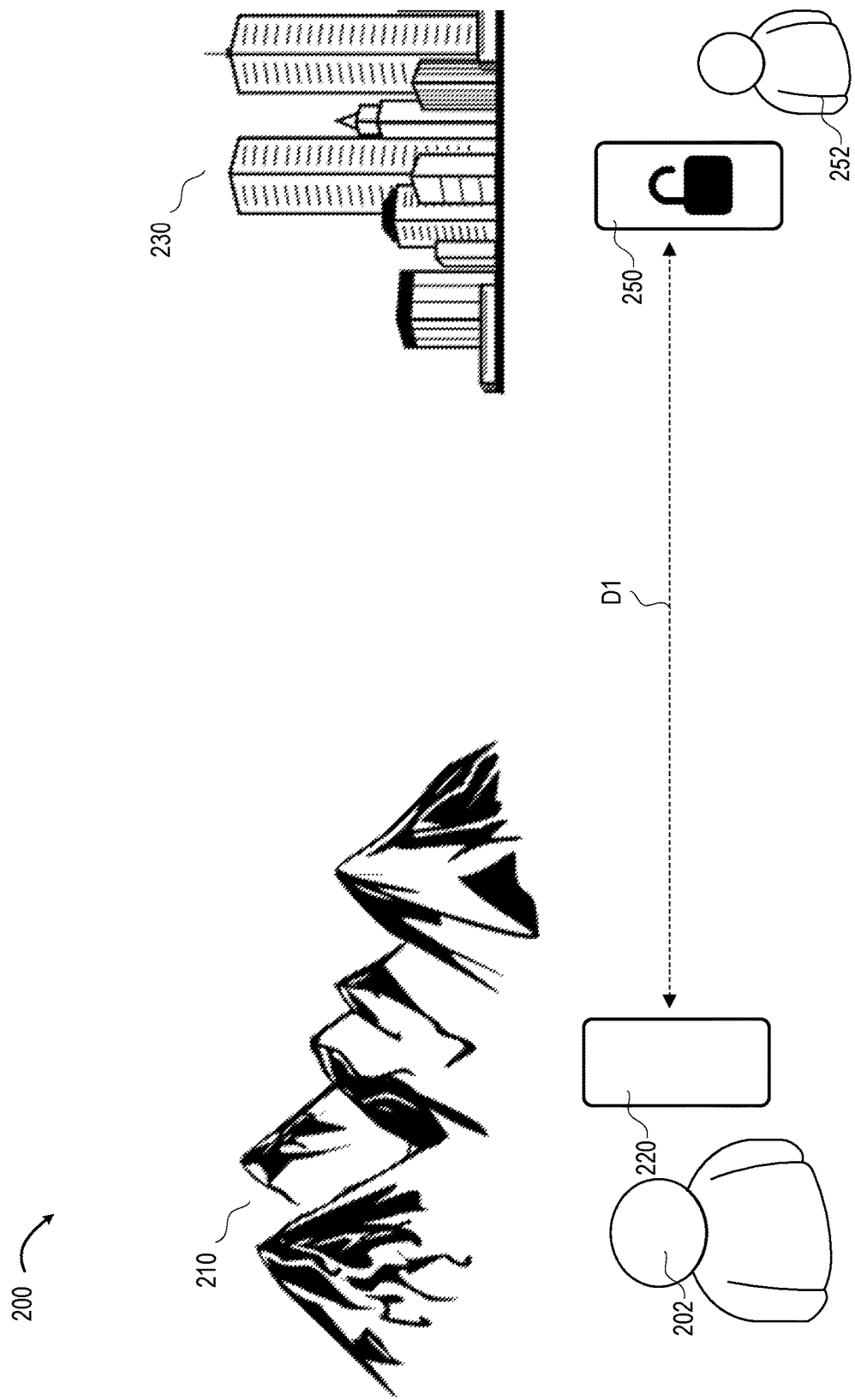
FIG. 2 is a diagram illustrating a device operating in a privilege mode in response to a circumstantial trigger based on distance between two electronic devices, according to one or more embodiments.

FIG. 2 is a diagram 200 illustrating a first device operating in a privilege mode in response to a circumstantial trigger based on distance between the first device and a second electronic device, according to one or more embodiments. In the diagram 200, a managing user 202, such as a parent, is located at a first location 210, along with his/her corresponding electronic device 220 (e.g., his/her smartphone). A managed user 252, such as a child 252 of managing user 202, is located at a second location 230, along with his/her corresponding electronic device 250 (e.g., his/her smartphone). Electronic device 220 and electronic device 250 can be implementations of communication device 100 (FIG. 1) having the same or similar components and providing the same or similar functions as communication device 100. The distance between communication device 220 and communication device 250 is indicated as D1. In one or more embodiments, the distance D1 is determined based on a GPS module disposed within communication device 220 and communication device 250. In diagram 200, communication device 220 is a managing device and communication device 250 is the managed device. In one or more embodiments, the managing device 220 reports its location (e.g., longitude and latitude) to the managed device 250 via a wireless communication network (e.g., 137 of FIG. 1). In one or more embodiments, a managing user can establish a predetermined separation distance threshold, and distance D1 can exceed the predetermined threshold. As an example, the predetermined threshold is a value in the range of 50 kilometers to 80 kilometers. In one or more embodiments, the predetermined threshold can be established in units of miles, feet, yards, meters, or other suitable distance units. In one or more embodiments, the predetermined threshold is configurable by the managing user 202 via the managed device 220.

The scenario depicted in FIG. 2 can be indicative of a situation in which a parent has travelled to a location that is distant from the location of his/her child, such that the child (e.g., a teenager), is spending considerable time (e.g., overnight), alone. Conversely, the child may have travelled to a distant location from home and/or the parent. In these situations, the parent may desire to set the privilege mode of the managed device 250 to a temporary privilege mode that allows unrestricted usage. This can improve safety for the child, by enabling him/her to contact his/her parent or others in the event of emergencies or other problems that could arise while the parent and/or child is out of town or separated from each other by a preset threshold distance.

In one or more embodiments, the first electronic device: monitors a location of the first electronic device; monitors a location of the second (managed) electronic device; determines a distance between the first electronic device and the second electronic device; and detects the start of the circumstantial trigger in response to determining that the distance between the first electronic device and the second electronic device exceeds a predetermined threshold.

Figure 3:
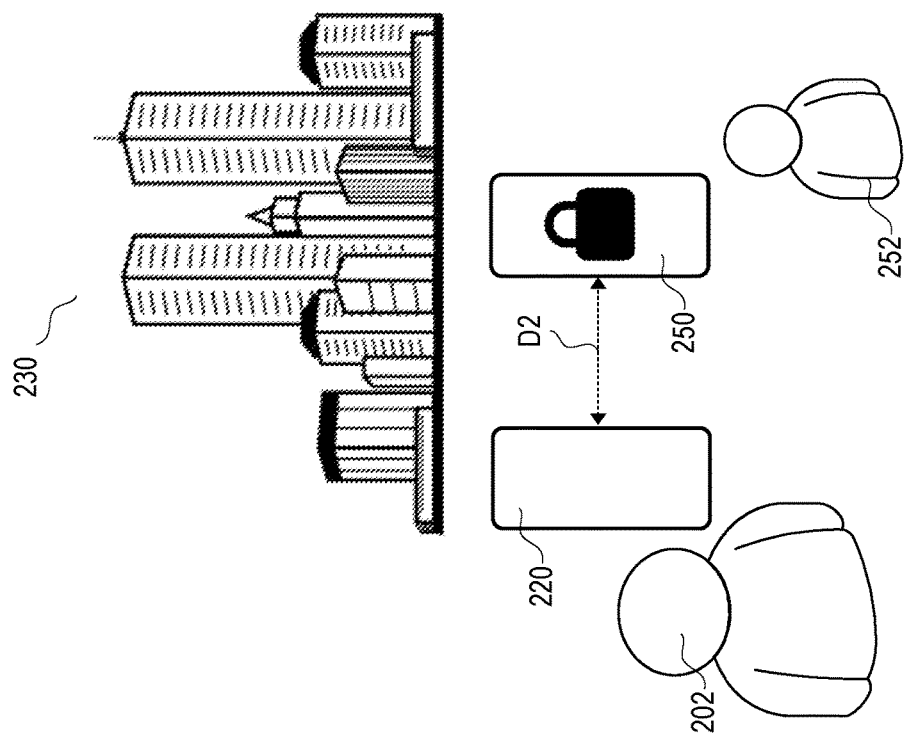
FIG. 3 is a diagram illustrating a device operating in another privilege mode in response to a circumstantial trigger based on distance between two electronic devices, according to one or more embodiments.
Figure 3:
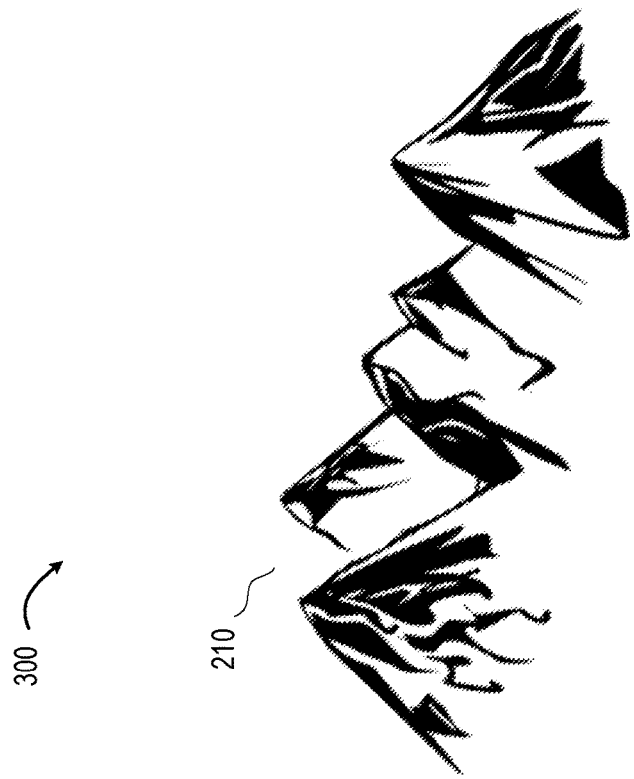

FIG. 3 is a diagram 300 illustrating the first device of FIG. 2 operating in another privilege mode in response to a circumstantial trigger that is based on distance between the two electronic devices, according to one or more embodiments. Diagram 300 depicts a scenario, continuing from FIG. 2, in which the managing user 202, along with his/her managing device 220, has returned to location 230. For example, the managing user 202 (e.g., parent), has returned home from a trip. The distance between the managing device 220 associated with parent 220 and the managed device 250 associated with child 252 is D2, where D2 is less than D1. In one or more embodiments, D2 is less than the predetermined threshold. Upon detecting that the distance between the managing device 220 and managed device 250 is below the predetermined threshold, the managed device reverts from the temporary privilege mode to a default privilege mode that can include one or more usage limits for the managed device 250 and/or for associated applications installed on the managed device 250. Accordingly, the problem of managing user 202 forgetting to restore the default privilege mode on managed device 250 is solved by implementing the features of the disclosed embodiments. Another advantage of the disclosed embodiments is that the circumstantial trigger of distance is temporally independent. That is, in a scenario where the managing user 202 is delayed in returning to location 230 from location 210, the temporary privilege mode remains in effect on managed device 250. In the event that the managed user has a flight delay, or needs to extend the trip for some reason, the managed device 250 remains in the temporary privilege mode. Once the managed device is located within the predetermined threshold distance from the managing device 250, the circumstantial trigger ends, and the managed device 250 automatically reverts to a previous (e.g., default) privilege mode, without the managing user 202 (e.g., parent) needing to take any additional actions.

Figure 4:
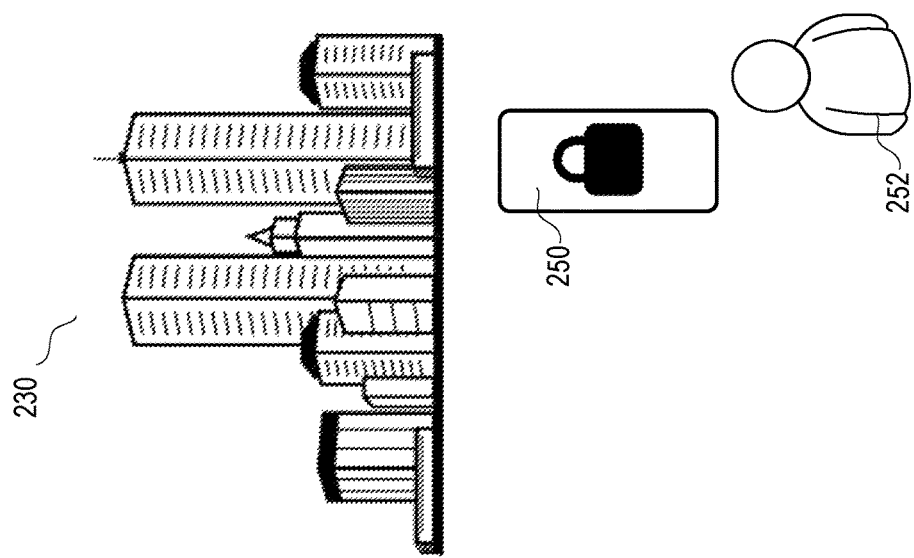
FIG. 4 is a diagram illustrating a device operating in a first privilege mode in response to a circumstantial trigger based on a location of the electronic device, according to one or more embodiments.
Figure 4:
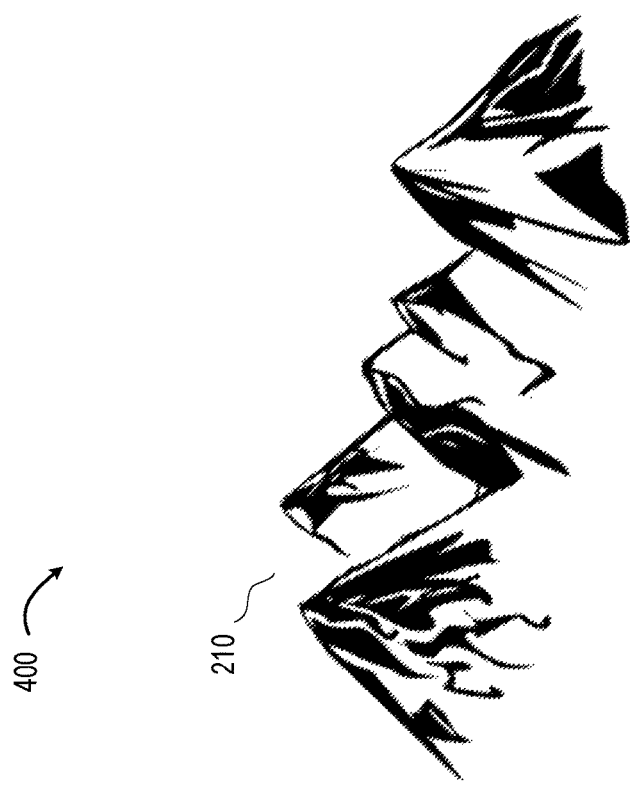

FIG. 4 is a diagram 400 illustrating a device operating in a first privilege mode in response to a circumstantial trigger based on a location of an electronic device, according to one or more embodiments. As depicted in diagram 400, a managed user 252, and his/her managed device 250 is at location 230. While at or near location 230, the managed device 250 is configured in a first privilege mode. In one or more embodiments, the first privilege mode includes usage limits for the managed device 250 and/or applications installed on the managed device 250 based on the device location.

Figure 5:
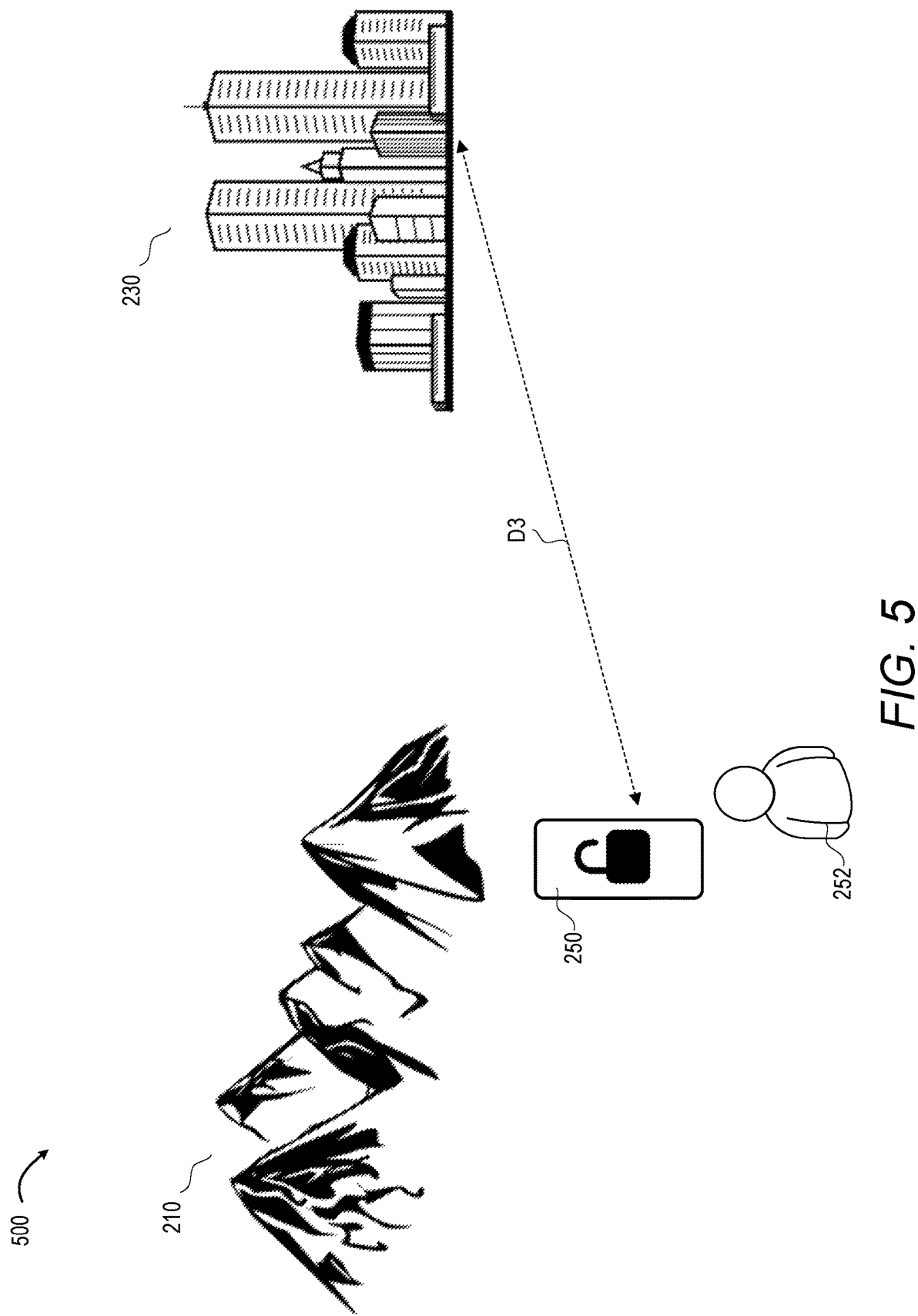
FIG. 5 is a diagram illustrating a device operating in a second privilege mode in response to a circumstantial trigger based on a location of the electronic device, according to one or more embodiments.

FIG. 5 is a diagram 500 illustrating a device operating in a second privilege mode in response to a circumstantial trigger based on a location of an electronic device, according to one or more embodiments. Diagram 500 depicts a scenario, continuing from FIG. 4, in which the managed user 252, along with his/her managed device 250, has gone on a trip to location 210. For example, the managed user 252 (e.g., child), has embarked on a school trip. In such a scenario, the managed device 250 is now a distance D3 from location 230. In one or more embodiments, location 230 can be established as a home location in managed device 250. In one or more embodiments, establishing the home or base location is accomplished by storing a geographical location, such as a longitude and latitude of the home location in memory of the managed device 250. In one or more embodiments, another geographical position indication, such as a plus code, may be stored in the memory of managed device 250 instead of, or in addition to, a longitude and latitude coordinate pair. Plus codes are location keys that represent street addresses as alphanumeric codes based on latitude and longitude. In one or more embodiments, the distance D3 exceeds a predetermined threshold. Once the managed device 250 is located at a distance that exceeds a predetermined threshold (e.g., 40 miles) away from location 230, then the managed device automatically operates in a second privilege mode. Once the managed device 250 returns to a location that is less than the predetermined threshold from location 230 (as depicted in FIG. 4), the managed device 250 automatically reverts to operating according to the first privilege mode. A use case for the aforementioned scenario can include when a child is going on a school trip without the parents. In that use case, the parent may wish to temporarily remove usage restrictions while the managed user (e.g., child) is on the school trip to allow full usage of the communication device or of certain applications or features of the communication device. Once the managed user returns home (e.g., such as depicted in FIG. 4), the managed device 250 automatically reverts to the first privilege mode, thereby eliminating the need for the managing user (e.g., parent) to have to remember to restore the first privilege mode to the managed user's electronic device 250.

In one or more embodiments, in response to determining that the electronic device has returned to a previously established location for operating the electronic device according to the first privilege mode, the at least one processor of the electronic device detects the end of the circumstantial trigger and returns the electronic device to the first privilege mode. In one or more embodiments, the at least one processor: monitors a location of the second electronic device; and in response to determining that the second electronic device has returned to a previously established location for operating the electronic device according to the first privilege mode, detects the end of the circumstantial trigger and returns the electronic device to the first privilege mode.

Figure 6:
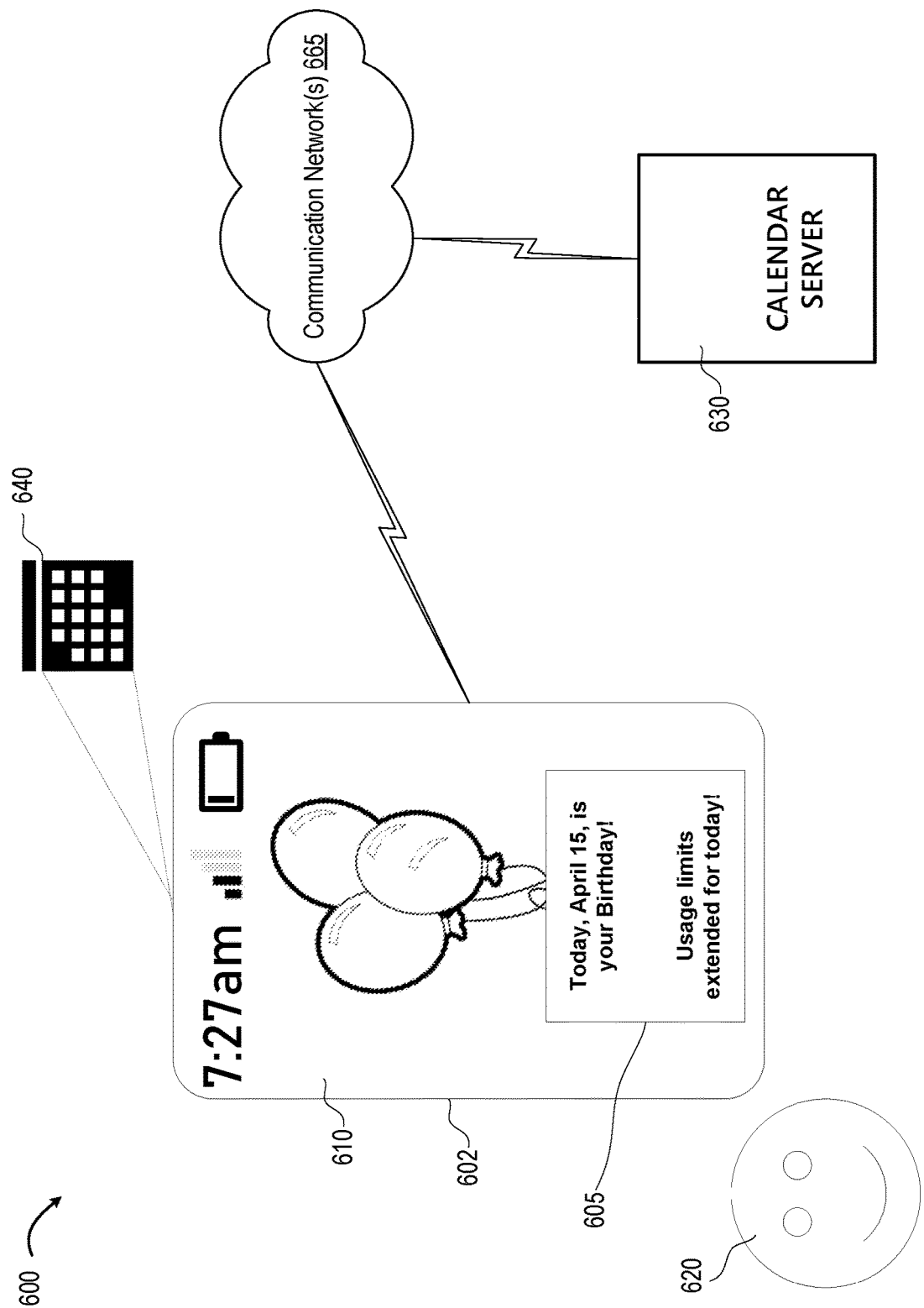
FIG. 6 is a device operating in a privilege mode in response to a calendar event, according to one or more embodiments.

FIG. 6 is a diagram 600 illustrating a device operating in a privilege mode in response to a calendar event, according to one or more embodiments. In the diagram 600, a managed user 620 has a corresponding managed device 602. Managed device 602 may be an implementation of communication device 100 (FIG. 1) having the same or similar components and providing the same or similar functions as communication device 100. Managed device 602 includes an electronic display 610. The managed device 602 communicates with a calendar server 630 via communication network(s) 665. Communication network(s) 665 can include one or more wired and/or wireless communication networks, including the Internet. The calendar server 630 can include one or more computers, virtual machines, containerized applications, and so on. The calendar server 630 can store calendar information in a format such as RFC 5545 (Internet Calendaring and Scheduling Core Object Specification), and/or other suitable format. The calendar server 630 can store holiday information, including international, national, regional, and/or local holiday information. Additionally, the calendar server 630 can store personal event information that pertains to managed user 620, such as birthdays, anniversaries, and the like.

In the diagram 600, the display 610 of device 602 renders a notification 605. Notification 605 indicates that usage limits for the device 602 are extended for the date of April 15, since it is the birthday of the user 620, based on information obtained from calendar server 630. In one or more embodiments, the start time of the circumstantial trigger is based on the start of a calendar event (e.g., the start of a date, such as April 15), and the end time of the circumstantial trigger is based on the end of a calendar event (e.g., the ending of a date, such as April 15). A possible use case for the scenario depicted in diagram 600 can include a parent allowing his/her child to have extra device usage limits for his/her birthday. On the following day, the privilege mode operating on device 602 reverts to the previous (e.g., default) operating mode, based on the ending of the circumstantial trigger. Accordingly, the disclosed embodiments eliminate the need for the managing user (e.g., parent) to remember to restore a privilege mode of a managing device based on a calendar event.

In one or more embodiments, instead of, or in addition to, operating on calendar events stored in calendar server 630, the device 602 may store a local calendar 640 that is internally stored within the system memory (120 of FIG. 1) of the device 602. This enables operations based on calendar events without the need for network connectivity. This can be useful when the device 602 is in a remote location without cellular or WiFi connectivity.

In one or more embodiments, the at least one processor increases access time for at least one of the electronic device, an application, and a service accessible on the electronic device, based on the electronic device transitioning from the first privilege mode to the second privilege mode. The accessible service can include a network connectivity service. The network connectivity service can include a bandwidth limit that is raised or lowered upon entering a privilege mode. The network connectivity service can include specifying a network connectivity type, such as LTE, 5G, WiFi, and the like. In one or more embodiments, the at least one processor reduces access time for at least one of the electronic device, an application, and a service accessible on the electronic device, based on the electronic device transitioning from the first privilege mode to the second privilege mode. In one or more embodiments, the electronic device obtains, from a calendar system, a calendar event associated with one or more of the electronic device and the second electronic device; and detects the start of the circumstantial trigger in response to determining that the calendar event is occurring.

Figure 7:
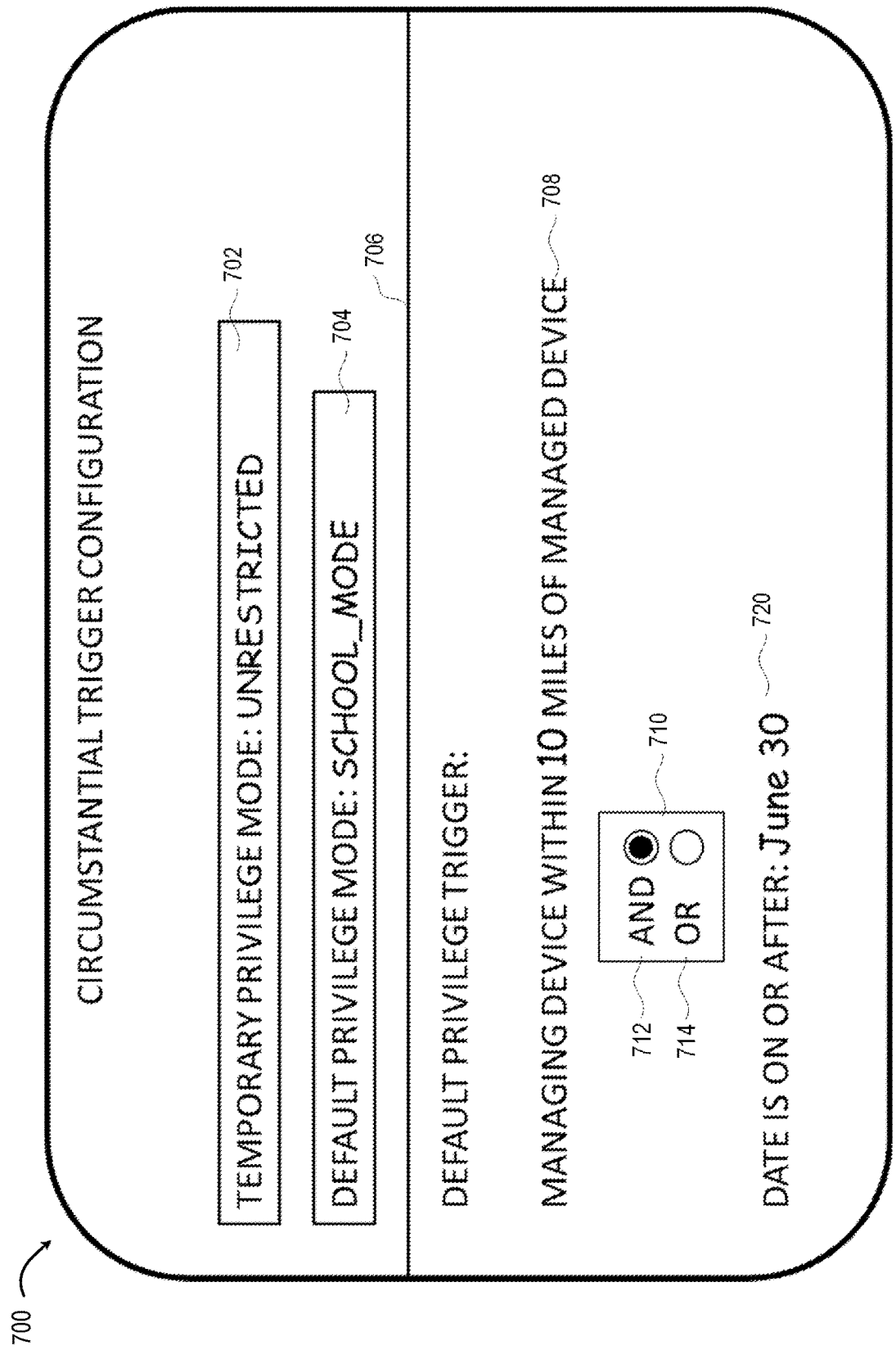
FIG. 7 is a diagram illustrating an exemplary user interface for configuring circumstantial triggers, according to one or more embodiments.

FIG. 7 is a diagram illustrating an exemplary user interface 700 for configuring circumstantial triggers for an electronic device, according to one or more embodiments. User interface 700 includes one or more fields that can be used by a managing user to configure the privilege mode operation of a managed user. Field 702 accepts entry of a temporary privilege mode. Field 704 accepts entry of a default privilege mode. The temporary privilege mode and default privilege mode can be established a priori by the managing user. Each privilege mode can include one or more usage policies for a managed device. As an example, the "unrestricted" privilege mode shown in field 702 can enable unlimited usage for the managed device, and the "school_mode" privilege mode shown in field 704 can impose usage limits, such as a maximum number of minutes per day, maximum number of minutes per week, time-of-day restrictions, and/or usage limit restrictions on particular applications installed on the managed device (e.g., social media applications).

User interface 700 includes a default privilege trigger section 706. Section 706 includes fields and/or controls to enable configuration of the conditions that cause the managed device to automatically revert to a default privilege mode. In one or more embodiments, the information obtained in user interface 700 can be stored on a managing device, a managed device, network storage, cloud storage, and/or other locations. At field 708, a distance between the managed device and a managing device of 10 miles is specified. Default privilege trigger section 706 further includes a Boolean control 710. The Boolean control 710 contains radio buttons corresponding to logical conditions, including radio button 712 corresponding to a logical 'and' condition, and radio button 714 corresponding to a logical 'or' condition. Section 706 further includes a date field 720. As shown in FIG. 7, the circumstantial trigger ending condition occurs when the managing device is within 10 miles of the managed device, and the date is on or after June 30. In one or more embodiments, complex circumstantial triggers can be configured by utilizing one or more Boolean controls. While only one Boolean control is shown in FIG. 7, in practice, user interface 700 can include multiple Boolean controls. In one or more embodiments, leaving a field empty nullifies a Boolean condition. As an example, if no date is entered in field 720, then Boolean control 710 has no effect, and the circumstantial trigger end is the single condition of the distance between the managing device and managed device as specified at field 708. Thus, disclosed embodiments can support a wide variety of circumstantial triggers.

In one or more embodiments, the settings, options, and/or configurations specified in user interface 700 can be transmitted from the managing device to the managed device via a communication network such as wireless communication network 137, communication network(s) 665, and/or other suitable communication networks. The options, settings and/or configurations can be transmitted from the managing device to the managed device via protocols such as HTTP (Hypertext Transfer Protocol), XML (Extensible Markup Language), JSON (JavaScript Object Notation), and/or other suitable protocols.

Figure 8:
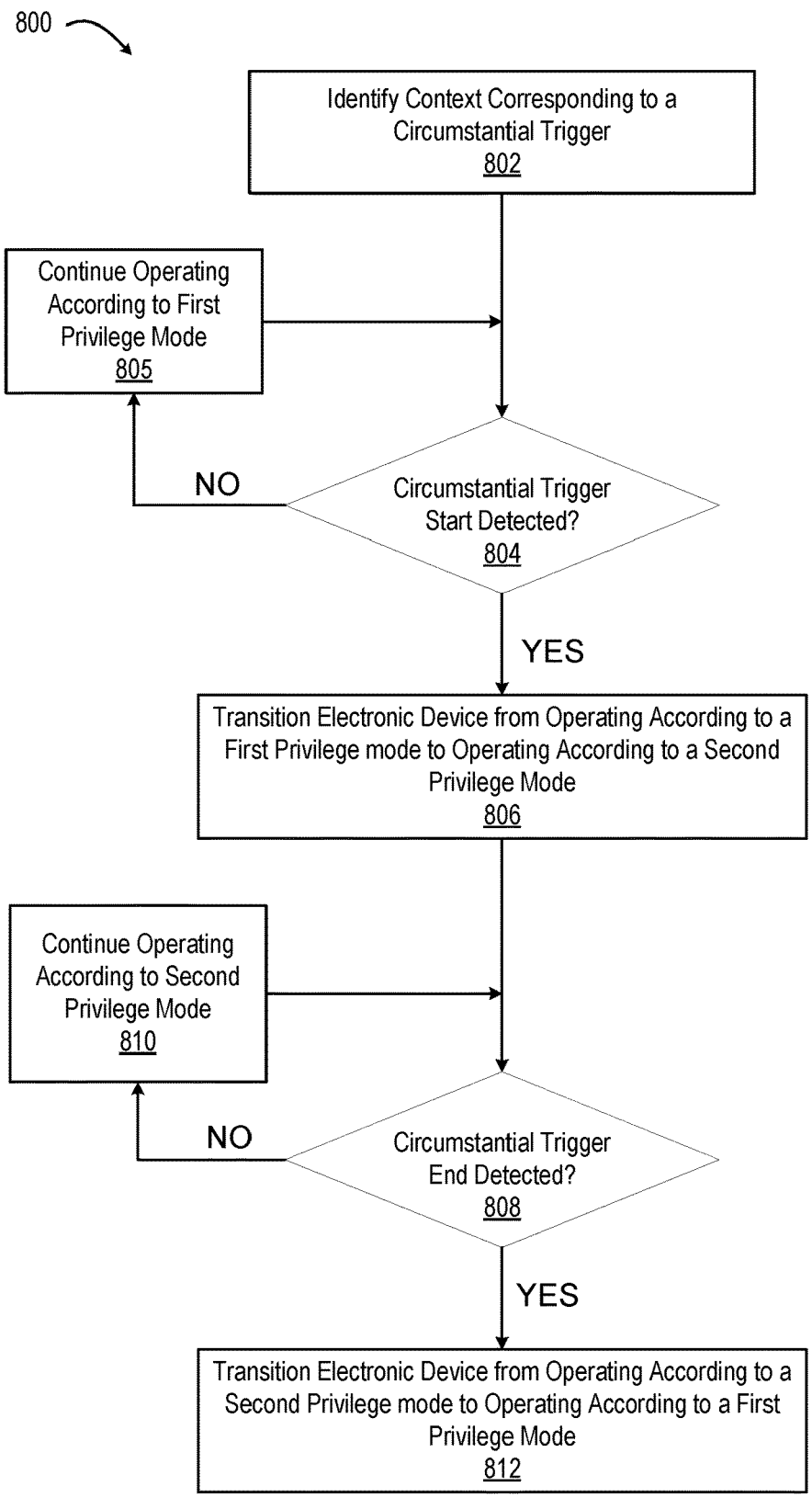
FIG. 8 depicts a flowchart of a method by which an electronic device enables modifying privilege modes based on a circumstantial trigger, according to one or more embodiments.

Referring now to FIG. 8, which provides a flow diagram presenting an embodiment of a method 800 performed by an electronic device to enable modifying a privilege mode on the electronic device, based on a circumstantial trigger, according to one or more embodiments. The descriptions of method 800 depicted in FIG. 8 are provided with general reference to the specific components and/or features illustrated within the preceding FIGS. 1-7. The operations depicted in FIG. 8 can be performed by electronic device 100 or any suitable electronic device that includes a controller, communication interface(s), and/or location sensors and/or geolocation receivers. One or more of the processes of the methods described in FIG. 8 may be performed by processor 102 executing program code associated with privilege control module 155.

Method 800 begins at block 802 at which method 800 includes identifying a context corresponding to a circumstantial trigger. In one or more embodiments, the circumstantial trigger is established a priori via a managing device by way of a user interface such as depicted in FIG. 7. The context can include one or more rules indicating conditions, that when met, indicate the start of a circumstantial trigger. The user interface 700 shows an example of setting up rules of this type. A managing user can establish a circumstantial trigger to enable automatically changing a privilege mode in a managed device. The circumstantial trigger can be based on location of a managed device and/or managing device, and/or a calendar event. In one or more embodiments, the circumstantial trigger starts when a calendar event starts.

Method 800 continues to block 804, at which method 800 includes determining whether a start of a circumstantial trigger is detected. In one or more embodiments, the circumstantial trigger starts when an electronic device reaches a certain location and/or a distance from a certain location. In one or more embodiments, the circumstantial trigger can be based on a calendar event. The calendar event can include a national holiday, regional holiday, local holiday, and/or personal event such as a birthday, anniversary, planned vacation, and so on. If, at block 804, the circumstantial trigger start is not detected, then the method 800 continues to block 805 where the method 800 includes continuing operating according to the first privilege mode, and the method 800 periodically (e.g., once per second) continues to check for the start of the circumstantial trigger at block 804. If, at block 804, the circumstantial trigger start is detected, then the method 800 continues to block 806, at which the method 800 includes transitioning a managed electronic device from operating according to a first privilege mode to operating according to a second privilege mode. In one or more embodiments, the second privilege mode can be less restrictive than the first privilege mode. For example, when a teenage child is away from his/her parents for an extended period, due to travel, or other circumstances, the parent may choose to temporarily reduce usage restrictions of the managed electronic device to enable the child to contact the parent or call for assistance at any time of day while the child is on his/her own. In one or more embodiments, the second privilege mode can be more restrictive than the first privilege mode. For example, if a child has an exam week at school, a managing user (e.g., parent) may create a calendar-based circumstantial trigger that causes the managed electronic device to enter a temporary privilege mode that is more restrictive than a default privilege mode. As an example, usage limits for social media applications may be reduced during the exam week to encourage the child to spend less time on social media, allowing for more time for studying for the exams.

Method 800 continues to block 808, at which the method 800 includes determining if the circumstantial trigger has ended. In one or more embodiments, the circumstantial trigger ends when an electronic device reaches a certain location and/or a distance from a certain location. In one or more embodiments, the circumstantial trigger can be based on a calendar event. The calendar event can include a national holiday, regional holiday, local holiday, and/or personal event such as a birthday, anniversary, planned vacation, and so on. In one or more embodiments, the circumstantial trigger ends when a calendar event ends. If, at block 808, it is determined that the circumstantial trigger has not ended, then the method 800 continues to block 810 where the method 800 includes continuing operating according to the second privilege mode, and the method 800 periodically (e.g., once per second) continues to check for the end of the circumstantial trigger at block 808. If, at block 808, the end of the circumstantial trigger is detected, then the method 800 continues to block 812, at which the method 800 includes transitioning the managed electronic device from operating according to the second privilege mode to operating according to the first privilege mode, thus, reverting the privilege mode to how the device was set prior to occurrence of the circumstantial trigger.

As can now be appreciated, disclosed embodiments enable more efficient managing of privilege modes for managed users. Excessive use of smartphones can have negative effects on children's development, including sleep disruption, decreased physical activity, and social isolation. Therefore, it is important to be cautious regarding smartphone use by children. By associating privilege mode changes with the start and/or end of circumstantial triggers, disclosed embodiments help ensure that managed devices are operating according to the correct privilege mode, without the need for manual intervention by the managing user. Thus, disclosed embodiments improve the technical field of privilege mode administration on managed electronic devices.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C"

is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a display;
a memory having stored thereon at least one application and a privilege mode control module for controlling the electronic device;
a network interface which enables the electronic device to connect to, and receive instructions from a second electronic device; and
at least one processor communicatively coupled to the display, the memory, and the network interface, and which executes program code of the privilege mode control module, which enables the electronic device to:
monitor a location of the electronic device relative to a base location;
access an electronic calendar to receive a start time and an end time for a calendar event from one of a calendar server and a local calendar;
identify a context corresponding to a circumstantial trigger based on the location of the electronic device and the calendar event;
transition the electronic device from operating according to a first privilege mode that is a more restrictive privilege mode for use of the electronic device to operating according to a second privilege mode that is a less restrictive privilege mode, in response to detecting a start of the circumstantial trigger; and
transition the electronic device from operating according to the second privilege mode to operating according to the first privilege mode in response to detecting an end of the circumstantial trigger.

2. The electronic device of claim 1, wherein the at least one processor configures the electronic device to:
in response to determining that the electronic device has returned to a previously established location for operating the electronic device according to the first privilege mode, detect the end of the circumstantial trigger and return the electronic device to the first privilege mode.

3. The electronic device of claim 1, wherein the at least one processor configures the electronic device to:
monitor a location of the second electronic device relative to the base location; and
identify a next context corresponding to a second circumstantial trigger based on the location of the second electronic device and the calendar event;
transition the electronic device from operating according to the first privilege mode that is more restrictive privilege mode to operating according to the second privilege mode that is the less restrictive privilege mode, in response to detecting a start of the second circumstantial trigger; and
in response to determining that the second electronic device has returned to the base location, detect the end of the second circumstantial trigger and return the electronic device to the first privilege mode.

4. The electronic device of claim 1, wherein the at least one processor configures the electronic device to:
monitor a location of the second electronic device;
determine a distance between the electronic device and the second electronic device; and
detect the start of the circumstantial trigger in response to determining that the distance between the electronic device and the second electronic device exceeds a predetermined threshold.

5. The electronic device of claim 1, wherein the at least one processor configures the electronic device to:
obtain, from a calendar system, the calendar event associated with one or more of the electronic device and the second electronic device; and
detect the start of the circumstantial trigger in response to determining the start time that the calendar event is scheduled to occur.

6. The electronic device of claim 1, wherein the at least one processor configures the electronic device to increase access time for at least one of the electronic device, an application, and a service accessible on the electronic device, on transition from the first privilege mode to the second privilege mode.

7. The electronic device of claim 1, wherein the at least one processor configures the electronic device to operate in the less restrictive second privileged mode in response to at least one of a user of the electronic device travelling away from a base location, a user of the second device travelling away from the base location, the user of the electronic device being temporarily separated from a parent/caregiver, and/or the electronic device receiving the calendar event indicating a specific event that is the circumstantial trigger.

8. A method comprising:
monitoring, by at least one processor of an electronic device, a location of the electronic device relative to a base location;
accessing an electronic calendar to receive a start time and an end time for a calendar event from one of a calendar server and a local calendar;
identifying, by at least one processor of an electronic device, a context corresponding to a circumstantial trigger based on the location of the electronic device and the calendar event;
transitioning the electronic device from operating according to a first privilege mode that is a more restrictive privilege mode for use of the electronic device to operating according to a second privilege mode that is a less restrictive limitations on use of the electronic device, in response to detecting a start of the circumstantial trigger; and
transitioning the electronic device from operating according to the second privilege mode to operating according to the first privilege mode in response to detecting an end of the circumstantial trigger.

9. The method of claim 8, wherein the circumstantial trigger is associated with a location of the electronic device, the method further comprising:
in response to determining that the electronic device has returned to a previously established location for operating the electronic device according to the first privilege mode, detecting the end of the circumstantial trigger and returning the electronic device to the first privilege mode.

10. The method of claim 8, wherein:
the electronic device is communicatively connected to and receives operating instructions from a second electronic device;
the circumstantial trigger is associated with a location of the second electronic device; and
the method further comprises:
receiving location information for the second electronic device;
identifying a next context corresponding to a second circumstantial trigger based on the location of the second electronic device;
transitioning the electronic device from operating according to the first privilege mode that is the more restrictive privilege mode to operating according to the second privilege mode that is the less restrictive privilege mode, in response to detecting a start of the second circumstantial trigger; and
in response to determining that the second electronic device has returned to the base location, detecting the end of the circumstantial trigger and returning the electronic device to the first privilege mode.

11. The method of claim 10, further comprising:
monitoring a location of the second electronic device;
determining a distance between the electronic device and the second electronic device; and
detecting the start of the circumstantial trigger in response to determining that the distance between the electronic device and the second electronic device exceeds a predetermined threshold.

12. The method of claim 10, further comprising:
obtaining, from a calendar system, the calendar event associated with one or more of the electronic device and the second electronic device; and
detecting the start of the circumstantial trigger in response to determining the start time that the calendar event is scheduled to occur.

13. The method of claim 8, further comprising increasing access time for at least one of the electronic device, an application, and a service accessible on the electronic device, on transition from the first privilege mode to the second privilege mode.

14. The method of claim 8, further comprising configuring the electronic device to operate in the less restrictive second privileged mode in response to at least one of a user of the electronic device travelling away from a base location, a user of the second device travelling away from the base location, the user of the electronic device being temporarily separated from a parent/caregiver, and/or the electronic device receiving the calendar event indicating a specific event that is the circumstantial trigger.

15. A computer program product comprising a non-transitory computer readable medium having program instructions that when executed by a processor of an electronic device configures the electronic device to perform functions comprising:
monitoring a location of the electronic device relative to a base location;
accessing an electronic calendar to receive a start time and an end time for a calendar event from one of a calendar server and a local calendar;
identifying a context corresponding to a circumstantial trigger based on the location of the electronic device and the calendar event;
transitioning the electronic device from operating according to a first privilege mode that is a more restrictive privilege mode for use of the electronic device to operating according to a second privilege mode that is a less restrictive limitations on use of the electronic device, in response to detecting a start of the circumstantial trigger; and
transitioning the electronic device from operating according to the second privilege mode to operating according to the first privilege mode in response to detecting an end of the circumstantial trigger.

16. The computer program product of claim 15, wherein the circumstantial trigger is associated with a location of the electronic device, wherein the computer program product further comprises program instructions for:
in response to determining that the electronic device has returned to a previously established location for operating the electronic device according to the first privilege mode, detecting the end of the circumstantial trigger and returning the electronic device to the first privilege mode.

17. The computer program product of claim 15, wherein the circumstantial trigger is associated with a location of a second electronic device, wherein:
the computer program product further comprises program instructions for:
monitoring a location of the electronic device;
receiving location information for the second electronic device; and
identifying a next context corresponding to a second circumstantial trigger based on the location of the second electronic device;
transitioning the electronic device from operating according to the first privilege mode that is the more restrictive privilege mode to operating according to the second privilege mode that is the less restrictive privilege mode, in response to detecting a start of the second circumstantial trigger; and
in response to determining that the second electronic device has returned to the base location, detecting the end of the circumstantial trigger and returning the electronic device to the first privilege mode.

18. The computer program product of claim 15, wherein the computer program product further comprises program instructions for:
monitoring a location of a second electronic device;
determining a distance between the electronic device and the second electronic device; and
detecting the start of the circumstantial trigger in response to determining that the distance between the electronic device and the second electronic device exceeds a predetermined threshold.

19. The computer program product of claim 15, wherein the computer program product further comprises program instructions for:
obtaining, from a calendar system, the calendar event associated with one or more of the electronic device and a second electronic device; and
detecting the start of the circumstantial trigger in response to determining the start time that the calendar event is scheduled to occur.

20. The computer program product of claim 15, wherein the computer program product further comprises program instructions for increasing access time for at least one of the electronic device, an application, and a service accessible on the electronic device, on transition from the first privilege mode to the second privilege mode.

* * * * *